April 23, 1968    K. J. BIALY    3,379,394
OPTICAL SOLAR ENERGY CONVERTER
Filed Oct. 27, 1964
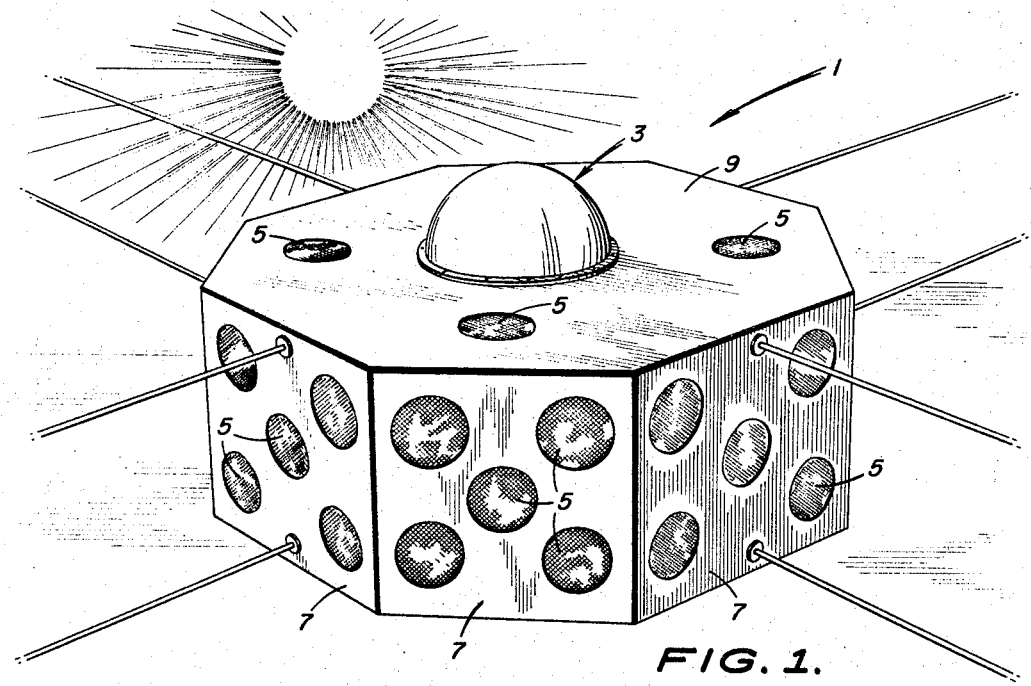
FIG. 1.
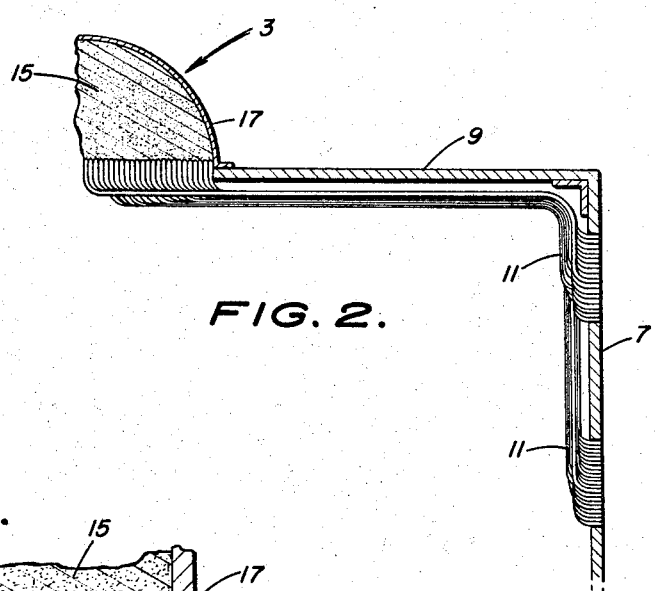
FIG. 2.
FIG. 3.
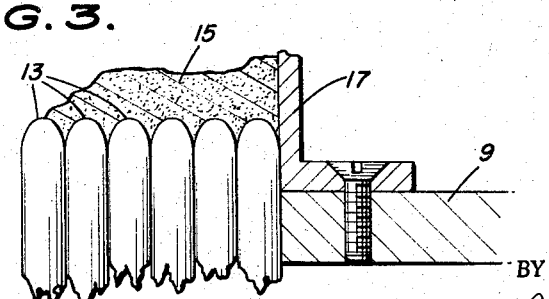
KAROL J. BIALY
INVENTOR.
BY Claude Funkhouser
ATTORNEY United States Patent Office 3,379,394
Patented Apr. 23, 1968

3,379,394
OPTICAL SOLAR ENERGY CONVERTER
Karol J. Bialy, Merritt Island, Fla., assignor to the United States of America as represented by the Secretary of the Navy
Filed Oct. 27, 1964, Ser. No. 406,950
11 Claims. (Cl. 244—1)

ABSTRACT OF THE DISCLOSURE

The present invention is an optical solar energy converter. By its use incident solar energy impinging on a plurality of surface areas, such as the walls of a space vehicle, may be collected by clusters of optical fibers and conducted to a common point for storage as thermal energy and subsequent conversion into electrical energy.

---

This invention relates generally to solar energy converters and more particularly to an optical solar energy converter wherein solar energy is collected over a surface area and is conducted to a separate area for conversion into thermal energy, and thence into electrical energy.

The use of solar cells to obtain electrical energy through the conversion from solar rays is impaired by high level radiation. The radiation impinging upon the cells causes damage to their crystalline structure and thereby reduces their efficiency in producing electrical energy. Therefore, because of the degradation of the output of these cells a movement away from using them as sources of electrical energy ensued, and the instant invention was devised to provide replacement for use in conjunction with a thermoelectric generator.

Thermoelectric generation of electrical energy is well-known and has recently been adapted for operation with a nuclear heat source. However, this combination has proven to be unreliable to date. The instant invention, being passive in nature, vastly outperforms its nuclear counterpart. Additionally, since it is impervious to radiation and electron bombardment, it overcomes the shortcomings of solar cells now employed to generate electrical energy for satellite operations.

Briefly, the invention contemplates the use, on a satellite, of a plurality of optical fiber clusters to collect solar rays which impinge upon the satellite, and flexible optical fiber strands for conducting the solar rays from the clusters to a common point where the rays are combined to concentrate the sun's energy, thereby obtaining a higher temperature than would be possible with individual strands. Additionally, the invention provides for thermal storage during periods of exposure to the sun, to provide heat for an accompanying thermoelectric generator during those periods when the satellite may be in the dark.

One object of the present invention, therefore, resides in providing an optical solar energy converter for collecting incident solar energy.

Another object of the invention is to provide a thermoelectric energy converter employing means for conducting incident thermal energy from a plurality of surfaces to a central concentrator.

A further object of the present invention is to provide thermal storage for periods in which there is no ambient sunlight, for maintaining a constant heat source.

The attendant advantages of this invention will be better appreciated and said invention will become clearly understood by reference to the following detailed description when considered in conjunction with the accompanying drawings illustrating one embodiment of the instant invention, wherein:

FIG. 1 is a perspective view of a satellite employing the instant invention;

FIG. 2 is a sectional view of a portion of the satellite shown in FIG. 1, illustrating the optical fibers employed in the instant invention to conduct solar energy to a central concentrator; and FIG. 3 is an enlarged view of one end of a plurality of the optical fibers illustrated in FIG. 2.

Referring again to the drawings, and more particularly to FIG. 1, there can be seen a satellite 1 having mounted thereon a thermoelectric generator unit 3 and a plurality of optical fiber clusters 5. A sufficient number of the optical fiber clusters 5 are mounted on each of the sides 7 of the satellite 1 to provide sufficient heat for the entire thermoelectric generating process. Additional optical fiber clusters 5 may be mounted on other portions of the satellite 1 which are exposed to ambient solar radiation, such as the surface 9. As best seen in FIG. 2, each of the optical fiber clusters 5 is comprised of the end portions of a plurality of optical fibers 11. The optical fibers 11 extend from the surfaces of the satellite, such as the surface 7, to the thermoelectric generator unit 3, and terminate therein. As best seen in FIG. 3, the ends of the optical fibers 11 which terminate in the thermoelectric generator unit 3 form a plurality of minute paraboloids 13. Solar energy impinging on the clusters 5 is transmitted through the optical fibers 11 and concentrated by the paraboloidal ends 13 thereof.

Referring again to FIG. 2 the thermoelectric generator unit 3 comprises a thermal block 15, such as is commonly constructed of graphite, and a thermoelectric generating element 17 (such as is common to the art) disposed about said thermal block 15 so as to be able to receive heat energy therefrom. The thermal block 15 receives the concentrated thermal energy from the paraboloidal ends of the optical fibers 11, provides a storage means therefor, and serves to provide a relatively constant heat source for the thermoelectric generating element 17 which converts the heat into electrical energy in a well-known manner.

It can readily be seen that many variations and modifications of the present invention are possible in the light of the above teachings and it will be apparent to those skilled in the art that various changes in form and arrangement of components may be made to suit requirements without departing from the spirit and scope of the invention. It is therefore to be understood that within the scope of the appended claims, the invention may be practised in a manner otherwise than as specifically described herein.

What is claimed is:

1. In combination with an orbiting satellite, an optical solar energy converter comprising:
    a plurality of optical fiber clusters on the surface of said satellite for receiving solar radiation,
    a thermal block for receiving and storing thermal energy from said optical fiber clusters,
    a plurality of optical fibers extending from said optical fiber clusters into said thermal block and each terminating in a minute paraboloid therein for concentrating energy being transmitted through each of said optical fibers, and
    a thermoelectric generator element connected with said thermal block for receiving thermal energy therefrom and converting it into electrical energy.

2. A thermoelectric energy converter comprising:
    a thermal block for receiving and storing thermal energy,
    a plurality of optical fibers for receiving and transmitting thermal energy to said thermal block, said optical fibers each terminating within said thermal block in the shape of a minute paraboloid for concentrating thermal energy, and
    a thermoelectric generator element connected with said thermal block for receiving thermal energy therefrom and converting said thermal energy into electrical energy.

3. The invention as recited in claim 1, wherein said thermal block comprises graphite.

4. The invention as set forth in claim 2, wherein said thermal block comprises graphite.

5. In combination with an orbiting satellite, an optical solar energy converter, including means mounted on the surface of said satellite for receiving solar radiation,
means for storing thermal energy,
clusters of optical fibers for transmitting said solar radiation from said radiation receiving means to said thermal storing means,
means on each of said fibers for concentrating said solar radiation within said thermal storing means, and
means for converting said thermal energy stored in said thermal storing means into electrical energy.

6. The invention as set forth in claim 5, wherein said concentrating means comprises a plurality of paraboloids at the ends of said fibers.

7. The invention as recited in claim 5, wherein said optical fibers each terminate within said thermal storage means in the shape of a paraboloid for providing said concentrating means.

8. The invention as related in claim 7, wherein said thermal storage means comprises a graphite compound.

9. A thermoelectric energy converter comprising:
means for storing thermal energy,
optical fiber clusters receiving, transmitting and concentrating thermal energy within said thermal energy storing means, and
means engaging said first-mentioned means for converting said thermal energy stored in said thermal storing means into electrical energy.

10. The invention as recited in claim 9, wherein said thermal storing means comprises a graphite block.

11. The invention as set forth in claim 9, wherein said optical fiber clusters each comprise a plurality of optical fibers, each fiber having one end thereof terminating in the shape of a paraboloid.

References Cited
UNITED STATES PATENTS

| | | | |
|---|---|---|---|
| 2,690,463 | 9/1954 | Clevett et al. | 136—206 |
| 2,984,696 | 5/1961 | Shaffer | 136—206 |
| 2,989,575 | 6/1961 | Wallace | 136—89 |
| 3,047,867 | 7/1962 | McNaney | 350—96 |
| 3,051,038 | 8/1962 | Duke | 350—96 X |
| 3,272,658 | 9/1966 | Rush | 136—201 |

ALLEN B. CURTIS, *Primary Examiner.*